US012738251B2

(12) United States Patent
Matsuzaki et al.

(10) Patent No.: US 12,738,251 B2
(45) Date of Patent: Sep. 15, 2026

(54) IMAGE PROCESSING DEVICE, IMAGE PROCESSING METHOD, AND COMPUTER PROGRAM

(71) Applicant: EIZO Corporation, Hakusan (JP)

(72) Inventors: Hiroki Matsuzaki, Hakusan (JP); Toru Yoshihara, Hakusan (JP); Tomoya Nakamura, Hakusan (JP)

(73) Assignee: EIZO Corporation, Hakusan (JP)

( * ) Notice: Subject to any disclaimer, the term of this patent is extended or adjusted under 35 U.S.C. 154(b) by 0 days.

(21) Appl. No.: 19/154,078

(22) PCT Filed: Feb. 16, 2024

(86) PCT No.: PCT/JP2024/005471

§ 371 (c)(1),
(2) Date: Aug. 6, 2025

(87) PCT Pub. No.: WO2024/224764

PCT Pub. Date: Oct. 31, 2024

(65) Prior Publication Data

US 2026/0237363 A1 Aug. 13, 2026

(30) Foreign Application Priority Data

Apr. 26, 2023 (JP) ................................ 2023-072603

(51) Int. Cl.
*G09G 5/391* (2006.01)
*G09G 5/00* (2006.01)

(52) U.S. Cl.
CPC ..... *G09G 5/003* (2013.01); *G09G 2320/0247* (2013.01); *G09G 2340/0435* (2013.01)

(58) Field of Classification Search
CPC ........... G09G 5/391; G09G 5/00; G09G 5/36; G09G 2340/0428; G09G 2340/0435;
(Continued)

(56) References Cited

U.S. PATENT DOCUMENTS

2017/0206417 A1* 7/2017 Aoyama .............. H04B 10/116
2019/0304410 A1* 10/2019 Ogaki .................... G09G 5/391
(Continued)

FOREIGN PATENT DOCUMENTS

CN 110036634 A 7/2019
CN 115938297 A 4/2023
(Continued)

OTHER PUBLICATIONS

International Search Report issued on Apr. 23, 2024, in corresponding International Application No. PCT/JP2024/005471; 4 pages.
(Continued)

*Primary Examiner* — Md Saiful A Siddiqui
(74) *Attorney, Agent, or Firm* — Maier & Maier, PLLC

(57) ABSTRACT

An image processing device includes an image data acquisition unit and an image processing unit that executes a frame rate control processing. A plurality of gradations include at least an nth gradation (n≥0) and an Nth gradation (N≥n+2). The target gradation is greater than the nth gradation and less than the Nth gradation. The image data acquisition unit acquires a plurality of input frames. The image processing unit selects a gradation to be assigned to a pixel of interest of the input frames from the plurality of gradations based on a magnitude relationship between a random number and a random number threshold, and generates a plurality of output frames to represent the target gradation based on the selected gradation. The random number is provided for each pixel of interest.

7 Claims, 8 Drawing Sheets

Example of a Table of the Setting Processing Unit 2

| Target Gradation | Low Gradation (n) | High Gradation (N) | Random Number Threshold |
|---|---|---|---|
| 1 | 0 | 6 | 10 |
| 2 | 0 | 6 | 20 |
| 3 | 0 | 6 | 31 |
| 4 | 1 | 6 | 96 |
| . | . | . | . |
| . | . | . | . |
| . | . | . | . |
| 15 | 10 | 16 | 200 |

(58) Field of Classification Search
CPC .. G09G 3/20; G09G 5/003; G09G 2320/0247; G06F 7/588; G06F 17/18; H04N 5/66
See application file for complete search history.

(56) References Cited

U.S. PATENT DOCUMENTS

| | | | | |
|---|---|---|---|---|
| 2020/0035176 | A1* | 1/2020 | Ohhara | G09G 3/3648 |
| 2021/0304650 | A1* | 9/2021 | Yamamoto | G09G 3/007 |

FOREIGN PATENT DOCUMENTS

| | | | |
|---|---|---|---|
| JP | H05333831 | A | 12/1993 |
| JP | H07160224 | A | 6/1995 |
| KR | 20030046099 | A | 6/2003 |
| WO | 2018104993 | A1 | 6/2018 |

OTHER PUBLICATIONS

Office Action issued on Jul. 4, 2025, in corresponding Taiwanese Application No. 113114720; 12 pages.

* cited by examiner

FIG. 4

Example of a Table of the Setting Processing Unit 2

| Target Gradation | Low Gradation (n) | High Gradation (N) | Random Number Threshold |
|---|---|---|---|
| 1 | 0 | 6 | 10 |
| 2 | 0 | 6 | 20 |
| 3 | 0 | 6 | 31 |
| 4 | 1 | 6 | 96 |
| ·<br>·<br>· | ·<br>·<br>· | ·<br>·<br>· | ·<br>·<br>· |
| 15 | 10 | 16 | 200 |

IMAGE PROCESSING DEVICE, IMAGE PROCESSING METHOD, AND COMPUTER PROGRAM

TECHNICAL FIELD

The present invention relates to an image processing device, an image processing method, and a computer program.

BACKGROUND ART

Regarding gradation representation in image display apparatuses, frame rate control processing is known (see, for example, Patent Literature 1). In frame rate control processing, by utilizing the integration effect of the human eye that occurs when a person perceives multiple frames with different gradations, it is possible to make the person perceive a pseudo-intermediate gradation (target gradation) that is different from the gradations of the multiple frames. For example, by executing frame rate control processing using adjacent gradations that can be displayed by the panel of an image display apparatus (e.g., a gradation value of 4 and a gradation value of 5), it is possible to generate a pseudo-intermediate gradation that the panel cannot display (e.g., 4.5), thereby expanding the gradation representation capabilities of the image display apparatus.

CITATION LIST

Patent Literature

[Patent Literature 1] Japanese Patent Application Publication No. H7-160224

SUMMARY OF INVENTION

Problem Solved by Invention

Depending on the type of display panel that represents the output frames generated by an image processing device, the display quality of a certain gradation may be degraded. For example, an organic EL display, unlike a liquid crystal display, does not have a backlight, which makes it easy to represent low gradations (black) and capable of representing clear images with a high contrast ratio. However, when displaying an image with a relatively low gradation on an organic EL display, there are gradations among the lower levels (excluding the case where the gradation value is 0) where the display quality of the image degrades, for instance, due to the effects of circuit noise or the like. In liquid crystal displays as well, it is conceivable that there are gradations where the image display quality degrades, for example, due to the influence of the backlight.

Furthermore, in frame rate control processing, it is possible to represent an intermediate gradation (target gradation) by, for example, switching between a relatively high gradation and a relatively low gradation for display. However, if the gradations displayed sequentially in the temporal direction are biased, the image may be perceived as flicker, increasing the likelihood that the image display quality will be degraded. This effect of flicker becomes more pronounced when the difference between the relatively high and low gradations is large.

The present invention has been made in view of such circumstances, and an object thereof is to provide an image processing device, an image processing method, and a computer program that can suppress the degradation of image display quality.

Solution to Problem

According to the present invention, an image processing device according to [1] is provided.

[1] An image processing device configured to execute frame rate control processing for representing a target gradation based on a plurality of gradations, the image processing device comprising an image data acquisition unit; and an image processing unit that executes the frame rate control processing, wherein the plurality of gradations include at least an nth gradation ($n \geq 0$) and an Nth gradation ($N \geq n+2$), wherein the target gradation is greater than the nth gradation and less than the Nth gradation, wherein the image data acquisition unit acquires a plurality of input frames, wherein the image processing unit selects a gradation to be assigned to a pixel of interest in the plurality of input frames from the plurality of gradations based on a magnitude relationship between a random number and a random number threshold, and generates a plurality of output frames for representing the target gradation based on the selected gradation, wherein the random number is provided for each pixel of interest, and wherein the random number threshold is associated with the target gradation, the nth gradation, and the Nth gradation, and the random number threshold is set such that a rate at which the Nth gradation is selected becomes larger than a rate at which the nth gradation is selected, as the target gradation increases.

In the present invention, it is possible to execute frame rate control processing to represent a target gradation that is greater than the nth gradation and less than the Nth gradation. Here, the relationship $N \geq n+2$ is satisfied, meaning there is a gap between the nth gradation and the Nth gradation. As described above, for example, when displaying an output frame on an organic EL display, there are gradations where the image display quality degrades due to the influence of circuit noise or the like. However, in the present invention, by using the nth and Nth gradations, which have a guaranteed gap between them, it becomes possible to generate such a gradation with degraded image display quality in a pseudo manner, allowing that gradation to be covered by frame rate control processing.

Furthermore, in the present invention, the image processing unit selects the gradation to be assigned to the pixel of interest of the plurality of input frames from the plurality of gradations based on the magnitude relationship between the random number and the random number threshold. Therefore, a relatively high gradation and a relatively low gradation are assigned probabilistically from the plurality of gradations. For this reason, the introduction of factors that cause flicker, such as a bias in the gradations displayed in the output frames, is suppressed.

Thus, in the present invention, it is possible to generate a gradation with degraded image display quality in a pseudo manner, and the introduction of factors that cause flicker, such as a bias in the gradations displayed in the output frames, is suppressed. Therefore, the degradation of image display quality is suppressed.

Various embodiments of the present invention are exemplified below. The embodiments shown below can be combined with each other.

[2] The image processing device of [1], wherein the random numbers for adjacent pixels of interest differ in aspect.

[3] The image processing device of [1] or [2], wherein, when the gradation of the pixel of interest in consecutive output frames within a predetermined period is within a range from the nth gradation to the Nth gradation, n and N satisfy the following formula (1), where S is 0.008 seconds or more and 0.042 seconds or less, S' is 0.042 seconds or more and 1.000 second or less, function f is a function related to the target gradation and returns a range of a visual gradation discrimination threshold, and T is a value of the target gradation.

$$\frac{(N-n)(S'-S)}{S'} \leqq f(T), \quad \text{Formula (1)}$$

[4] The image processing device of any one of [1] to [3], wherein the nth gradation is a 0 gradation.

[5] The image processing device of any one of [1] to [4], wherein the image processing unit uses the random number threshold only when representing a target gradation that is equal to or less than a predetermined upper limit value.

[6] The image processing device of [1], wherein the random numbers for adjacent pixels of interest are generated by processing (a), processing (b), processing (c), or processing (d), in the processing (a), the random numbers for the adjacent pixels of interest are sequentially generated in a temporal direction with a different algorithm for each adjacent pixel of interest, in the processing (b), the random numbers for the adjacent pixels of interest are sequentially generated in the temporal direction with the same algorithm for each adjacent pixel of interest, under a condition where at least one of an initial value of the random number and a period of the random number is different for each adjacent pixel of interest, in the processing (c), the random numbers for a plurality of the pixels of interest included in a plurality of adjacent regions are generated with a different algorithm for each adjacent region, and in the processing (d), the random numbers for the plurality of the pixels of interest in the plurality of adjacent regions are generated with the same algorithm for each adjacent region.

[7] The image processing device of any one of [1] to [6], further comprising an image display unit configured to display the output frames generated by the image processing unit or frames processed based on the output frames.

[8] An image processing method performed by a computer, for executing frame rate control processing for representing a target gradation based on a plurality of gradations, the method comprising an image data acquisition step; and an image processing step of executing the frame rate control processing, wherein the plurality of gradations include at least an nth gradation ($n \geq 0$) and an Nth gradation ($N \geq n+2$), wherein the target gradation is greater than the nth gradation and less than the Nth gradation, wherein in the image data acquisition step, a plurality of input frames is acquired, wherein in the image processing step, a gradation to be assigned to a pixel of interest in the plurality of input frames is selected from the plurality of gradations based on a magnitude relationship between a random number and a random number threshold, and a plurality of output frames for representing the target gradation is generated based on the selected gradation, wherein the random number is provided for each pixel of interest, and wherein the random number threshold is associated with the target gradation, the nth gradation, and the Nth gradation, and the random number threshold is set such that a rate at which the Nth gradation is selected becomes larger than a rate at which the nth gradation is selected, as the target gradation increases.

[9] A computer program for causing a computer to execute the image processing method of [8].

BRIEF DESCRIPTION OF DRAWINGS

FIG. 4 schematically shows a table held by a setting processing unit 2 shown in FIG. 2.

FIG. 6 shows a situation where the fluctuation of the moving average A3 is suppressed (a constant value in FIG. 6) and flicker is suppressed.

In FIG. 7, the gradation transition A1 of the input frame is the same as in FIG. 5, but the gradations of the output frame and the content of its moving average are different from those of FIG. 5, resulting in a transition that is prone to flicker.

FIG. 8 shows a connecting line A12, which connects the gradation values of pixels of an output frame arranged in an arbitrary direction at an arbitrary timing, and a moving average A13 of the connecting line A12. FIG. 8, similar to FIG. 5, does not show a situation where the frame rate control processing according to the present embodiment is executed, but is merely an example.

DESCRIPTION OF EMBODIMENTS

Hereinafter, embodiments of the present invention will be described with reference to the drawings. Various features shown in the embodiments below can be combined with each other. Furthermore, an invention can be established independently for each feature.

1. Overall Configuration Description

Figure 1:
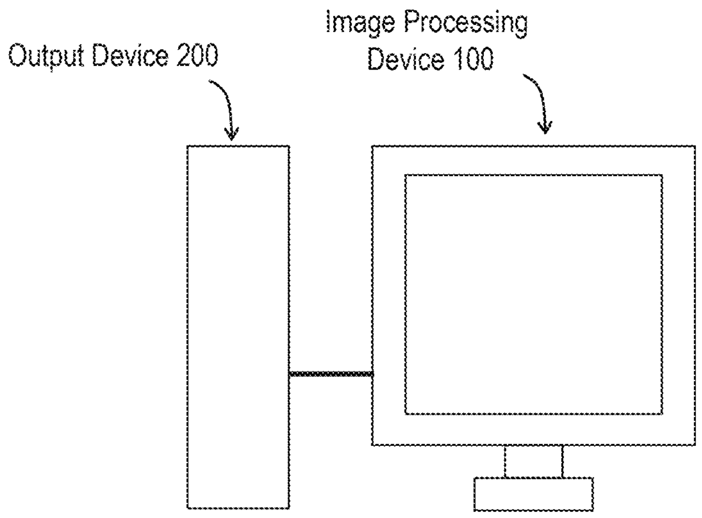
FIG. 1 is a schematic diagram showing an image processing device 100 and an output device 200 that outputs a video signal according to an embodiment.

The overall configuration of an image processing device 100 according to an embodiment will be described. In the embodiment, as shown in FIG. 1, the image processing device 100 is communicably connected to an output device 200. The output device 200 is an information processing device (for example, a personal computer) and is configured to be able to output input frames, which are video signals.

Figure 2:
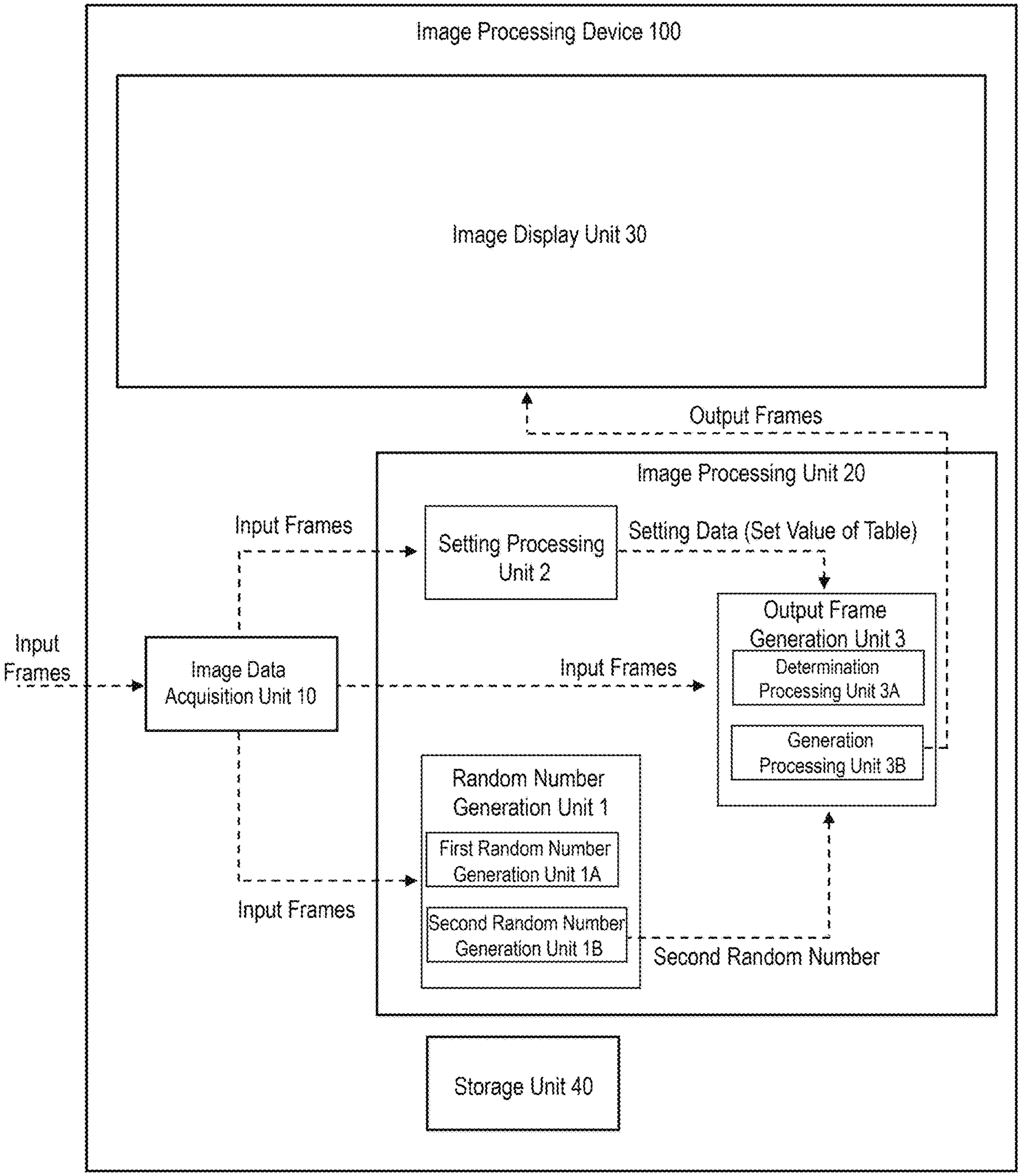
FIG. 2 is a functional block diagram of the image processing device 100 shown in FIG. 1.

As shown in FIG. 2, the image processing device 100 includes an image data acquisition unit 10, an image processing unit 20, an image display unit 30, and a storage unit 40 configured to be able to store various data. The storage unit 40 stores, for example, data used in various processes of the image processing unit 20. The image processing device 100 includes a random number generation unit 1, a setting processing unit 2, and an output frame generation unit 3.

Each component of the image processing device 100 may be realized by software or by hardware. When realized by software, various functions can be realized by a CPU executing a computer program. The program may be stored in a built-in storage unit or in a computer-readable non-transitory recording medium. Alternatively, it may be realized by so-called cloud computing, by reading a program stored in an external storage unit. When realized by hardware, it can be realized by various circuits such as an ASIC, FPGA, or DRP (Dynamically Reconfigurable Processor). In the present embodiment, various information and concepts including them are handled, but these are represented by high and low signal values as a bit set of binary numbers composed of 0s and 1s, and communication and operations can be executed by the aspects of the above-mentioned software, hardware, or a combination of software and hardware.

The image data acquisition unit 10 is configured to acquire a plurality of input frames. The input frames acquired by the image data acquisition unit 10 are sent to the image processing unit 20 and the like, where frame rate control processing, which will be described later, is performed. In the embodiment, it is described that the image data acquisition unit 10 acquires input frames from the output device 200, but the present invention is not limited to this, and they may be acquired from, for example, the Internet or the like.

The image processing unit 20 is configured to be able to execute frame rate control processing. For example, when the gradation (gradation value) of a certain pixel is switched at high speed, the human eye has the property of seeing the pixel as displaying an intermediate gradation between the gradations before and after the switching (integration effect). Frame rate control processing can represent an intermediate gradation (target gradation) by switching between a relatively high gradation and a relatively low gradation at high speed. In other words, frame rate control processing can generate a pseudo-intermediate gradation (target gradation) by utilizing the integration effect on human vision, and the range of representable gradations can be expanded.

Here, in frame rate control processing, when generating an intermediate gradation (target gradation), there are cases where image flicker is perceived by humans, for example, depending on the gradation value of the pixels of the output frame. Note that flicker can be grasped as, for example, a bias in the data included in the output frame (e.g., the gradation of an arbitrary pixel of the output frame remains the same value for a long time). The image processing device 100 according to the present embodiment has a function of suppressing the above-mentioned data bias when executing frame rate control processing and suppressing the occurrence of flicker caused by the image displayed on the image display unit 30.

The image display unit 30 is configured to display the output frames output from the image processing unit 20. Note that, for example, the image processing device 100 may include an image processing circuit (not shown) downstream of the output frame generation unit 3, and the image display unit 30 may be configured to display frames that have been subjected to image processing by the image processing circuit based on the output frames. In the embodiment, the display of the image display unit 30 can be composed of an organic EL display (OLED display), but it is not limited to this. The display of the image display unit 30 may be another display such as a liquid crystal display or electronic paper. Note that the embodiment is suitable for cases where the image display unit 30 employs an organic EL display.

Here, an organic EL display, unlike a liquid crystal display, does not have a backlight, so it is easy to represent low gradations (e.g., black) and can represent clear images with a high contrast ratio. On the other hand, when displaying an image with a relatively low gradation on an organic EL display, there are gradations among the lower levels (excluding the case where the gradation value is 0) where the display quality degrades. Therefore, it is expected that the disadvantages of the organic EL display can be overcome by representing the gradations with degraded display quality by frame rate control processing. The degradation of display quality is considered to be caused by, for example, variations in organic EL elements, characteristics of the driver IC, and analog noise.

However, when conventional frame rate control processing is executed, as described above, there is a circumstance that flicker is likely to occur. In the present embodiment, it is possible to suppress the occurrence of flicker even when frame rate control processing is executed.

2. Image Processing Unit 20

The image processing unit 20 includes the random number generation unit 1, the setting processing unit 2, and the output frame generation unit 3. The image processing unit 20 is configured to select a gradation to be assigned to a pixel of interest in a plurality of input frames from the plurality of gradations based on a magnitude relationship between a random number and a random number threshold. Then, the image processing unit 20 generates a plurality of output frames for representing the target gradation based on the selected gradation. The functions of the image processing unit 20 will be described in detail below.

In the embodiment, in order to generate a target gradation corresponding to a pseudo-intermediate gradation, the image processing unit 20 probabilistically assigns a relatively high gradation and a relatively low gradation to a plurality of output frames to be generated. Since the gradation is specified for each pixel (for each pixel of interest), in the embodiment, a relatively high gradation and a relatively low gradation are probabilistically assigned to each pixel of interest in the plurality of output frames to be generated. In other words, in the embodiment, a probabilistic element is introduced into the determination of the content (i.e. gradation) of the output frame, and the occurrence of bias in the data included in the output frame (e.g., the gradation of an arbitrary pixel of the output frame remains the same value for a long time) is suppressed. Note that the pixel of interest mentioned above corresponds to a pixel on which the frame rate control processing described in the embodiment is executed.

In the embodiment, in introducing a probabilistic element into the determination of the content of the output frame, the image processing unit 20 uses a random number and a random number threshold, which will be described later.

2-1. Random Number Generation Unit 1

The random number generation unit 1 is configured to generate a random number (a random number to be compared with a random number threshold described later) used when generating an output frame. Then, the random number generation unit 1 assigns the generated random number to each pixel. In the embodiment, the random number takes a value from 0 to 255, but it is not limited to this range and can be changed according to the bit depth of the gradation.

In the embodiment, the random number used when generating an output frame is generated through a plurality of random number generation processes. That is, the random number generation unit 1 has a first random number generation unit 1A and a second random number generation unit 1B. The first random number generation unit 1A is configured to execute a first random number generation process to generate a first random number, and the second random number generation unit 1B is configured to execute a second random number generation process to generate a second random number. In the embodiment, the second random number is the random number used when generating the output frame (the random number to be compared with the random number threshold described later). Various algorithms can be adopted for the first random number generation process and the second random number generation process, and an example in the embodiment will be described below.

For the first random number generation process, for example, the XORSHIFT algorithm can be adopted. The XORSHIFT algorithm is an algorithm capable of generating uniformly distributed random numbers (pseudo-random numbers).

The second random number generation process may be the same as or different from the first random number generation process. In the embodiment, the second random number generation process is the same as the first random number generation process and adopts the XORSHIFT algorithm. The second random number generation process generates a second random number based on the first random number generated in the first random number generation process. In other words, the second random number generation process uses the first random number generated in the first random number generation process as an initial value and generates a second random number (the random number to be compared with the random number threshold described later) using the XORSHIFT algorithm.

In the embodiment, by the random number generation unit 1 recursively executing the XORSHIFT algorithm as described above, the quality of the finally used random number (the random number to be compared with the random number threshold described later) can be improved.

Note that in the embodiment, XORSHIFT is described as being used as the algorithm for the first and second random number generation processes, but instead of XORSHIFT, for example, the Mersenne Twister may be used, or WELL may be used.

A random number is given to each pixel. The process by which the random number of a frame is calculated will be described below.

Figure 3:
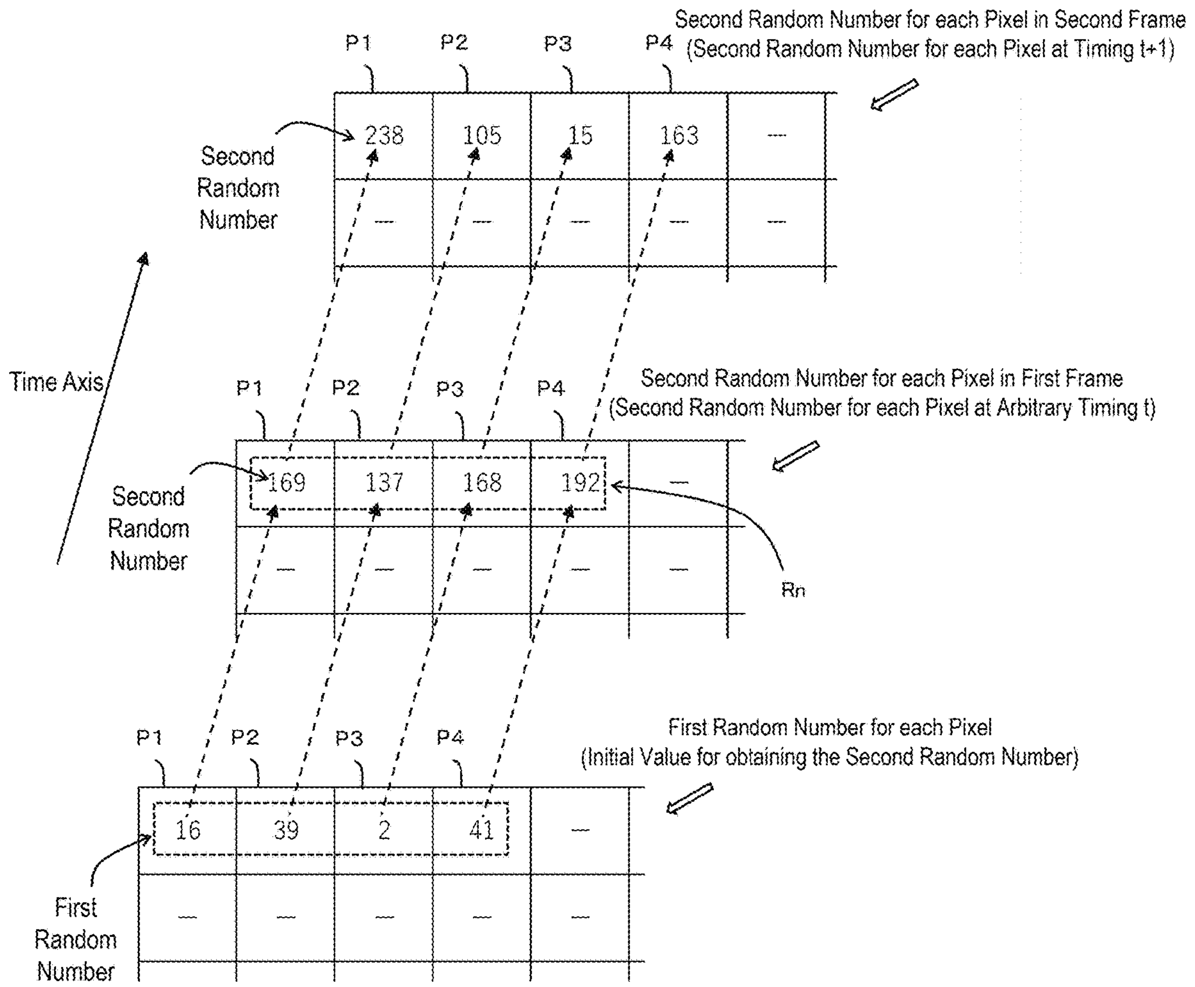
FIG. 3 schematically shows a first random number assigned to each pixel and a second random number for each timing of a frame generated using the first random number as an initial value.

The coordinates of the pixels in the frame shown in FIG. 3 are defined as P1, P2, P3, and P4. Although other pixels also exist in the frame, for convenience of explanation, the description here is limited to coordinates P1 to P4. FIG. 3 shows an example where the first random number for the pixel at coordinate P1 is 16, the first random number for the pixel at coordinate P2 is 39, the first random number for the pixel at coordinate P3 is 2, and the first random number for the pixel at coordinate P4 is 41.

By executing the first random number generation process, the sequentially generated first random numbers are individually assigned to each coordinate of the frame. Any value can be used as the initial value used in the first random number generation process.

The second random number of the pixel at coordinate P1 at an arbitrary timing is obtained using the first random number of the pixel at coordinate P1. Specifically, the second random number of the pixel at coordinate P1 is generated by applying the second random number generation process (in the embodiment, the XORSHIFT algorithm) to the first random number (16) as an initial value. That is, by executing the second random number generation process with the first random number as the initial value, the sequentially generated random numbers become the second random numbers at each timing for the pixel at coordinate P1. In FIG. 3, the second random number at timing t for the pixel at coordinate P1 is 169, and the second random number at timing t+1 for the pixel at coordinate P1 is 238. The second random numbers for pixels at other coordinates at an arbitrary timing can also be obtained in the same manner as above.

In the embodiment, in the spatial and temporal directions of the frame, the random numbers of adjacent pixels (pixels of interest) differ in aspect. Specifically, the random numbers of adjacent pixels (pixels of interest) are generated by processing (a), processing (b), processing (c), or processing (d).

In processing (a), the random numbers for adjacent pixels of interest are sequentially generated in the temporal direction with a different algorithm for each adjacent pixel of interest. Processing (a) corresponds to, for example, adopting the above-mentioned XORSHIFT for the pixel at coordinate P1 and adopting the Mersenne Twister for the pixel at coordinate P2.

In processing (b), the random numbers for adjacent pixels of interest are sequentially generated in the temporal direction with the same algorithm for each adjacent pixel of interest. However, in processing (b), at least one of an initial value of the random number and a period of the random number is different for each adjacent pixel of interest. Processing (b) corresponds to, for example, both the pixel at coordinate P1 and the pixel at coordinate P2 adopting the above-mentioned XORSHIFT, but at least one of the initial value of the random number and the period of the random number being different. For example, for a random number sequence having a certain period, the position within the period to be used, or the length of the sequence to be used, may differ. Specifically, as an example where positions within the period differ, if a random number sequence from the XORSHIFT algorithm has a period of, for example, 300,000 terms, the pixel corresponding to coordinate P1 could use the random numbers from terms 1 to 100,000, while the pixel corresponding to coordinate P2 could use the remaining random numbers.

In processing (c), the random numbers for a plurality of pixels of interest included in adjacent multiple regions are generated with a different algorithm for each adjacent region. The region in processing (c) can be defined by a plurality of pixels included in a predetermined range of the image display unit 30. The adjacent multiple regions are adjacent to each other but do not overlap. For example, one of two adjacent regions is a plurality of pixels arranged horizontally in the top row, and the random numbers for this plurality of pixels are generated by XORSHIFT. The other of the two adjacent regions is a plurality of pixels arranged horizontally in the row one step below the top row, and the random numbers for this plurality of pixels are generated by the Mersenne Twister.

In processing (d), the random numbers for a plurality of pixels of interest in adjacent multiple regions are generated with the same algorithm for each adjacent region. However, in processing (d), at least one of an initial value of the random number and a period of the random number may be different or the same for each of the adjacent multiple regions.

Note that in processing (c) and processing (d), a region may be a single pixel.

To supplement, processing (a) and processing (b) correspond to the process of generating random numbers that are given to the pixel (pixel of interest) at each coordinate, which transitions in the temporal direction. For example, for the pixel at coordinate P1 shown in FIG. 3, the random number transitions in the temporal direction as 16, 169, 238, and processing (a) and processing (b) correspond to the generation of such random numbers that transition in the temporal direction.

On the other hand, processing (c) and processing (d) correspond to the process of generating random numbers that are given to the pixel (pixel of interest) at each coordinate, which transitions in the spatial direction. For example, as shown in FIG. 3, in the spatial direction, the random number at coordinate P1 transitions to 16, the random number at coordinate P2 to 39, the random number at coordinate P3 to 2, and the random number at coordinate P4 to 41, and processing (c) corresponds to the generation of such random numbers that transition in the spatial direction. In other words, processing (a) and processing (b) are processes for giving random numbers that transition in the temporal direction, and processing (c) and processing (d) are processes for giving random numbers that transition in the spatial direction.

2-2. Setting Processing Unit 2

The setting processing unit 2 is configured to be able to set a random number threshold for comparison with a random number according to a target gradation. The random number threshold set by the setting processing unit 2 is associated with the target gradation, a relatively high gradation (an example of the Nth gradation), and a relatively low gradation (an example of the nth gradation). In other words, for each target gradation, the setting processing unit 2 has set a gradation value for the relatively high gradation, a gradation value for the relatively low gradation, and a random number threshold.

In the following description, the target gradation, the gradation value of the relatively high gradation, the gradation value of the relatively low gradation, and the random number threshold will also be referred to as setting data. In the following description, the relatively high gradation will also be referred to as the high gradation, and the relatively low gradation will also be referred to as the low gradation.

In the embodiment, it is described that the setting data is set as a table, but it is not limited to this, and it may be set as a function.

The various values in the setting data (table) of the setting processing unit 2 can be set in advance by, for example, the manufacturer or user of the image processing device 100.

Furthermore, a plurality of setting data (a plurality of tables) may be stored in the image processing device 100, and the setting data (table) to be used may be changed as appropriate according to the situation.

<Target Gradation>

The setting data (table) of the setting processing unit 2 will be specifically described with reference to FIG. 4.

The target gradation in the table is an intermediate gradation that is generated in a pseudo manner by switching between frames of a high gradation and a low gradation. This target gradation is a value greater than the low gradation (an example of the nth gradation) and less than the high gradation (an example of the Nth gradation).

The target gradation is a number greater than 0, and in the example shown in FIG. 4, the target gradation is an integer from 1 to 15. The target gradation is not limited to being an integer as long as it is a number greater than 0, and may be a value such as 0.5 or 1.5.

Here, as described above, an organic EL display has gradations among the low gradations (hereinafter also referred to as display quality degradation gradations) where the display quality degrades due to, for example, analog noise. Such gradations depend on the panel characteristics of the organic EL display and can be known in advance. Therefore, the display quality degradation gradations are included in the target gradations. In other words, although it is a gradation that can be displayed without using frame rate control processing, if this gradation is displayed without using frame rate control processing, the display quality will degrade, so this gradation is intentionally generated in a pseudo manner using frame rate control processing.

Further, a predetermined upper limit value is provided for the target gradation, and in the embodiment, the upper limit value is 15. In other words, in the embodiment, the frame rate control processing according to the embodiment is not executed for all gradations (all pixels). This is because it is assumed that there are no display quality degradation gradations at higher gradations. Also, if the frame rate control processing according to the embodiment is executed for all gradations, the data processing load of the image processing unit 20 may increase. Therefore, in the embodiment, a predetermined upper limit value is provided for the target gradation to suppress the data processing load of the image processing device 100.

<Low Gradation and High Gradation>

The high gradation and the low gradation in the table are set to gradation values that are considered preferable for generating a specific target gradation in a pseudo manner. When the gradation value of the low gradation is n and the gradation value of the high gradation is N, the relationship $n \geq 0$ and $N \geq n+2$ is satisfied. For example, in the table in FIG. 4, to represent a target gradation=1, the high gradation is set to 6 and the low gradation is set to 0 (that is, n=0), which satisfies the above relationship. The high and low gradations for other target gradations similarly satisfy this relationship.

Here, the fact that the low gradation is 0 is particularly effective when the image display unit 30 employs an organic EL display. This is because, while a liquid crystal display has the disadvantage that when the gradation value is 0, the display quality is impaired due to the difficulty of representing black due to the influence of the backlight, an organic EL display has overcome this disadvantage and is characterized by being able to easily ensure display quality when the gradation value is 0.

For this reason, from the viewpoint of display quality, it is preferable that 0 is set for the low gradation of the target gradation in the table of the setting processing unit 2, but the present invention is not limited to this. This is because, for example, if the low gradation in the table is only 0, it is conceivable that there may be cases where it is difficult or impossible to generate the target gradation. In such a case, the low gradation may be set to a value greater than 0 (in FIG. 4, the low gradation is a value greater than 0 when the target gradation is 4 or more). In this case, for the low gradation and the high gradation, for example, gradations other than the display quality degradation gradations may be selected, or alternatively, a combination of gradations with relatively good quality among the display quality degradation gradations may be selected.

<Random Number Threshold>

The random number threshold takes a value greater than 0 and less than or equal to 255, but it is not limited to this range and can be changed according to the bit depth of the gradation. The random number threshold is set such that the rate at which the high gradation is selected becomes larger than the rate at which the low gradation is selected as the target gradation increases. Specifically, as shown in the table in FIG. 4, the random number threshold takes a larger value as the target gradation increases. For example, when the target gradation is 1, the random number threshold is 10, but when the target gradation is 2, the random number threshold is 20. In this way, by increasing the random number threshold as the target gradation increases, the rate (probability) at which the high gradation is selected as the gradation of the output frame increases, as will be described in the output frame generation unit 3 later. Note that it is preferable to use the median value (e.g., 127 or 128) of the entire gradation range (256 in the example of the embodiment) as the random number threshold, but this is not a limitation as it changes depending on the situation.

2-3. Output Frame Generation Unit 3

The output frame generation unit 3 generates an output frame based on the input frame, the random number generated by the random number generation unit 1 (in the embodiment, the second random number generated by the second random number generation process), and the setting data of the setting processing unit 2. The output frame generation unit 3 includes a determination processing unit 3A and a generation processing unit 3B.

<Determination Processing Unit 3A>

The determination processing unit 3A has a function of determining whether to execute the frame rate control processing according to the embodiment for each pixel of the input frame, based on the gradation value of each pixel of the input frame and the upper limit value of the target gradation of the setting processing unit 2.

In the embodiment, by the determination processing unit 3A executing the above-described determination, the generation processing unit 3B, which will be described later, uses the random number threshold only when representing a target gradation that is equal to or less than a predetermined upper limit value.

That is, the determination processing unit 3A sets pixels with a gradation value equal to or less than this upper limit value among the pixels of the input frame as pixels of interest, and pixels with a gradation value exceeding the upper limit value as non-target pixels. The pixels of interest are pixels that are subject to the frame rate control processing according to the embodiment, and the non-target pixels are pixels that are not subject to the frame rate control processing according to the embodiment.

For example, if the gradation value of a pixel at an arbitrary coordinate of the input frame is larger than the upper limit value of the target gradation (15 in the example of the embodiment), the frame rate control processing according to the embodiment is not performed on the pixel at that coordinate, and the gradation value of the pixel at that coordinate in this input frame becomes the gradation value of that coordinate in the output frame.

Conversely, if the gradation value of a pixel at an arbitrary coordinate of the input frame is equal to or less than the upper limit value of the target gradation (15 in the example of the embodiment), the frame rate control processing according to the embodiment is performed on the pixel at that coordinate. Then, the gradation value of the pixel at that coordinate will be processed by the generation processing unit 3B, which will be described later.

For example, if the gradation value of a pixel at an arbitrary coordinate of the input frame is 16, and the gradation value of a pixel at a coordinate adjacent to that arbitrary coordinate is 14, the former is a non-target pixel and the frame rate control processing according to the embodiment is not performed, but the latter is a pixel of interest and the frame rate control processing according to the embodiment is performed.

<Generation Processing Unit 3B>

The generation processing unit 3B is configured to select a gradation to be assigned to a pixel of interest in the input frame from a plurality of gradations in the setting data of the setting processing unit 2 (in the embodiment, a high gradation with gradation value of N and a low gradation with gradation value of n) based on the magnitude relationship between the random number from the random number generation unit 1 and the random number threshold from the table of the setting processing unit 2. That is, as shown in the following formula (2), the selected high gradation or low gradation becomes the gradation at the pixel of interest in the output frame.

$$\text{Output } \mathit{FrameGradation} \quad \begin{cases} \text{Low Gradation,} & \text{if Random Number} \geq \text{Random Number Threshold} \\ \text{High Gradation,} & \text{otherwise} \end{cases}, \qquad \text{Formula (2)}$$

For example, if the random number of an arbitrary pixel is greater than or equal to the random number threshold, the value of the low gradation corresponding to the target gradation of that arbitrary pixel is selected from the table. Also, if the random number of an arbitrary pixel is less than the random number threshold (the "otherwise" case), the value of the high gradation corresponding to the target gradation of that arbitrary pixel is selected from the table.

An example will be explained where the gradation value (target gradation) of a pixel at an arbitrary coordinate of an input frame is 4, and the random number of the pixel at that arbitrary coordinate is 80.

Since the gradation value (target gradation) of the pixel at that arbitrary coordinate is 4, which is smaller than the upper limit value (15), the determination processing unit 3A makes the pixel at that arbitrary coordinate a target for the execution of the frame rate control processing according to the embodiment. Then, since the random number (80) is smaller than the random number threshold (96) corresponding to the target gradation (4), the generation processing unit 3B selects the value of the high gradation (6) as the gradation of the output frame.

In this example, since the target gradation of the pixel at the arbitrary coordinate of the input frame is 4, the random number threshold is considerably higher compared to the cases where the target gradation is 1 to 3. Therefore, it can be said that the possibility of the random number being below the random number threshold and the high gradation being selected is increased compared to the cases where the target gradation is 1 to 3. And in this example, the random number (80) is actually below the random number threshold (96).

In the embodiment, by using the random number and the random number threshold in this way, whether the gradation of the pixel of interest in the output frame takes the low gradation or the high gradation is determined probabilistically. In other words, if the target gradation is high, the possibility of the high gradation being selected increases accordingly, and conversely, if the target gradation is low, the possibility of the low gradation being selected increases accordingly.

The gradation (target gradation) of the output frame, low gradation, high gradation, and random number threshold can be described as approximately satisfying the relationship represented by the following formula (3). In the following formula (3), the random number threshold is normalized, and a value obtained by dividing the value shown in the table by the bit depth (8 bits in the embodiment) is used.

$$\text{Representable Gradation (Target Gradation)} = (\text{Low Gradation} \times (1 - \text{Random Number Threshold})) + (\text{High Gradation} \times \text{Random Number Threshold}), \quad \text{Formula (3)}$$

3. Operational Description

3-1. Regarding Gradation Transition

The transition of the gradation of the pixels of an output frame when frame rate control processing is performed on the gradation of the pixels of an input frame will be described.

Here, for convenience of explanation, only the pixel of interest at an arbitrary coordinate of a frame will be described. Also, for convenience of explanation, it is assumed that the gradation (target gradation) of the pixel of interest at the arbitrary coordinate of the input frame is 12.5 at any timing (frame 1 to frame 13), and the gradation (target gradation) is constant.

Figure 5:
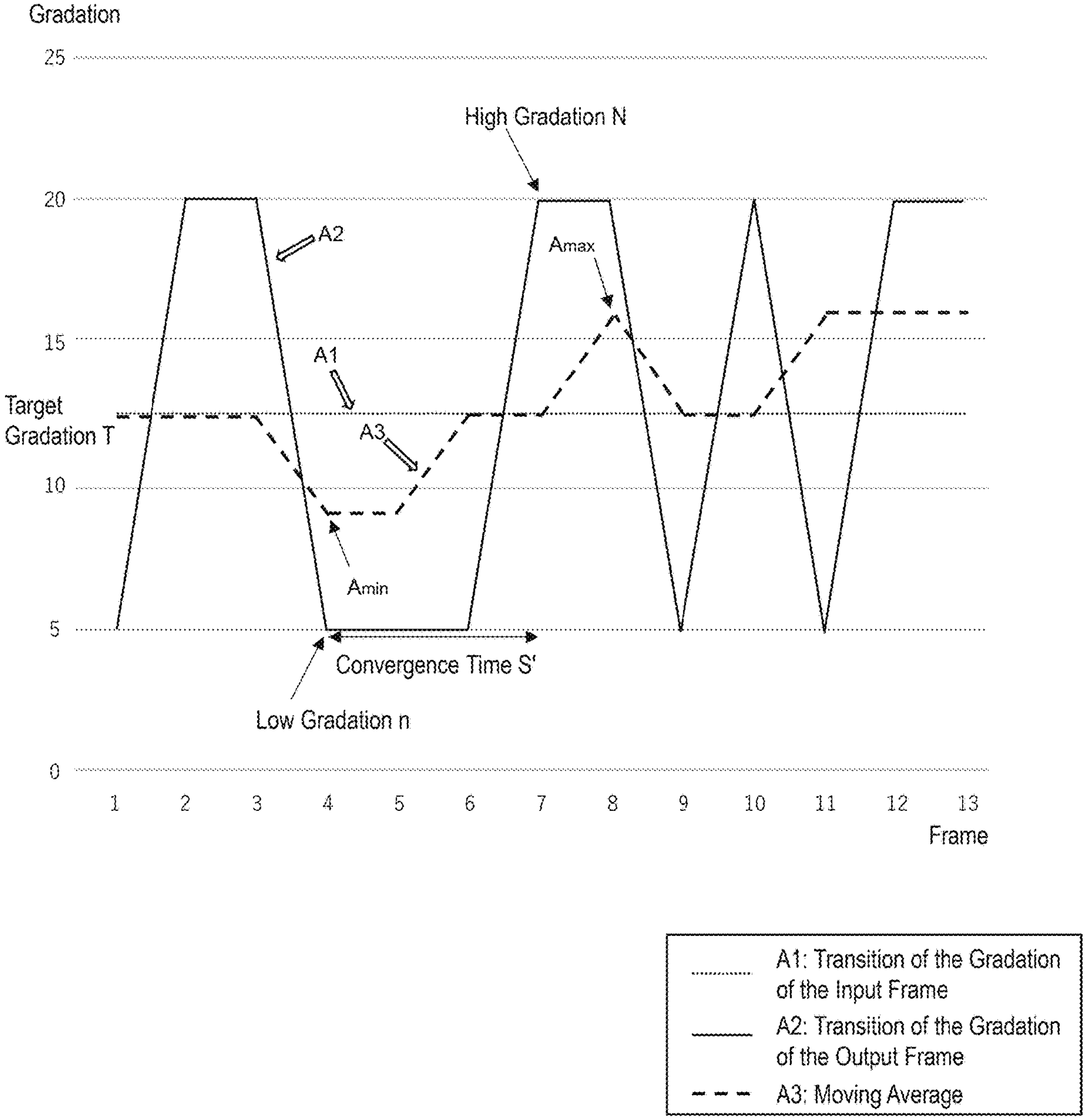
FIG. 5 shows an example of a gradation transition A1 of an input frame as a target gradation, a gradation transition A2 of an output frame, and a moving average A3 of the gradation of the output frame. Note that in FIG. 5, the gradation transition A2 of the output frame does not necessarily show a transition when the frame rate control processing according to the present embodiment is executed, but is merely an example.

FIG. 5 shows an example of a process in which the gradation of the pixels of an output frame transition by frame rate control. This FIG. 5 is not intended to show whether the transition process corresponds to either the frame rate control processing according to the embodiment or a conventional frame rate control processing method, but is intended to make specific the situations where flicker is likely to occur or unlikely to occur by defining the graph of gradation transition with parameters. Therefore, if the gradation of the output frame transitions as shown in FIG. 5, it does not necessarily mean that flicker is unlikely to occur.

The graph and parameters shown in FIG. 5 are as follows.

A1 represents the gradation (target gradation) of the input frame, and here, the gradation is fixed at 12.5.

A2 represents the transition of the gradation of the output frame that has been subjected to frame rate control processing.

A3 represents the moving average of a plurality of consecutive frames (here, 4 frames) at an arbitrary timing. The moving average can be assumed to be a pseudo-representation of the integration effect due to human visual characteristics. It can be considered that if the gradation difference of this moving average (e.g., the difference between the maximum value and the minimum value of the moving average) exceeds the visual gradation discrimination threshold, the gradation transition is perceived, and it is recognized as flicker.

S is the integration time by vision. That is, S corresponds to the time during which an image is displayed so that an integration effect occurs in the eye. S is, for example, 0.008 seconds or more and 0.042 seconds or less. The notation for S is omitted in FIG. 5.

S' corresponds to the length from the first timing at which the gradation of the output frame does not change to the first timing at which the gradation changes, in a certain arbitrary period (in the example of FIG. 5, the period from frame 1 to frame 13). In other words, S' can be said to be an index representing the bias of the data in the output frame. Note that FIG. 5 shows the longest S' in the period from frame 1 to frame 13.

If S' becomes longer, it means that the gradation of the output frame is not changing to converge to (approach) the target gradation, and flicker is more likely to occur in the image. Here, in frame rate control processing, the target gradation is represented by switching between a high gradation and a low gradation. If it takes time to switch between the high gradation and the low gradation, it leads to perceiving the high gradation itself or the low gradation itself, rather than perceiving an intermediate gradation between the high and low gradations. And if the difference between the high and low gradations has exceeded the visual gradation discrimination threshold, it will be recognized as flicker. Therefore, it can be said that a shorter length of S' makes it easier to suppress image flicker. Specifically, it is preferable that S' is 0.042 seconds or more and 1.000 second or less.

The length of S' changes depending on the values of the random number and the random number threshold. Therefore, S' can be defined as the convergence time to the target gradation, which is related to the random number and the random number threshold. For example, if the quality of the generated random number is poor, S' becomes longer, and flicker is more likely to occur in the image.

n is the value of the low gradation in the setting data (table) of the setting processing unit 2, and satisfies the relationship $n \geq 0$.

N is the value of the high gradation in the setting data (table) of the setting processing unit 2, and satisfies the relationship $N \geq n+2$.

T is the value of the target gradation in the setting data (table) of the setting processing unit 2, and satisfies the relationship $n < \text{target gradation} < N$.

Function f is a function related to the target gradation and is a function that returns the range of the visual gradation discrimination threshold. As this function f, a function can be adopted that returns a larger range of gradation discrimination threshold for a larger gradation value and a smaller range of gradation discrimination threshold for a smaller gradation value. For example, the Grayscale Standard Display Function (GSDF) defined in DICOM can be adopted. In other words, a function f can be adopted that, when a target gradation generated based on the DICOM Grayscale Standard Display Function is input, returns one step (the range of the gradation discrimination threshold). The function f is not limited to the DICOM Grayscale Standard Display Function, and for example, the Barten Ramp curve may be adopted.

Here, in the moving average, the low gradation perceived by the visual integration effect is defined as $A_{min}$, and the high gradation is defined as $A_{max}$. When S' is sufficiently short with respect to S, $A_{min}$ and $A_{max}$ converge to the value T of the target gradation due to the visual integration effect. That is, the following formula (4) will be satisfied.

$$A_{min}=A_{max}=T, \qquad \text{Formula (4)}$$

On the other hand, when S' is long with respect to S, it can be approximated that the gradation values n and N are being output during the time when $A_{min}$ and $A_{max}$ have not converged to the value T of the target gradation. Therefore, when S' is long with respect to S, $A_{min}$ and $A_{max}$ can be expressed as in the following formulas (5) and (6).

Note that in the following formulas (5) and (6), when S=S', it is the same as the above formula (4).

On the other hand, as S' approaches infinity, $A_{min}$ converges to n, and $A_{max}$ converges to N. And if the difference between n and N exceeds the visual gradation discrimination threshold, it will be perceived as image flicker.

$$A_{min}=\frac{T\times S+n\times(S'-S)}{S'} \qquad \text{Formula (5)}$$

$$A_{max}=\frac{T\times S+N\times(S'-S)}{\sigma'} \qquad \text{Formula (6)}$$

Since if the difference between $A_{min}$ and $A_{max}$ (gradation difference) exceeds the human gradation discrimination threshold, it is perceived as flicker by humans, it is preferable that the high gradation (N) and the low gradation (n) satisfy the following formula (7) with respect to the above parameters. In other words, in a case where the gradation of the pixel of interest in consecutive output frames within a predetermined period is within a range from the nth gradation to the Nth gradation, it is preferable that n and N satisfy the following formula (7).

$$A_{max}-A_{min}=\frac{(N-n)(S'-S)}{S'}\leqq f(T), \qquad \text{Formula (7)}$$

As described above, the length of S' changes depending on the values of the random number and the random number threshold. For example, if S' becomes large, the above formula can be satisfied by adjusting the values of the high gradation (N) and the low gradation (n). That is, by rewriting the above formula (7), it can be expressed as formula (8). In other words, the difference between the value of the high gradation and the value of the low gradation used for each target gradation in the setting data (table) of the setting processing unit 2 should be made smaller than the value corresponding to the left side of formula (8). In other words, it is preferable to set an upper limit value for the difference between the value of the high gradation and the value of the low gradation used for each target gradation in the setting data (table) of the setting processing unit 2.

$$N-n\leqq\frac{f(T)}{1-S/S'} \qquad \text{Formula (8)}$$

3-2. Gradation Transition when Flicker is Suppressed

Figure 6:
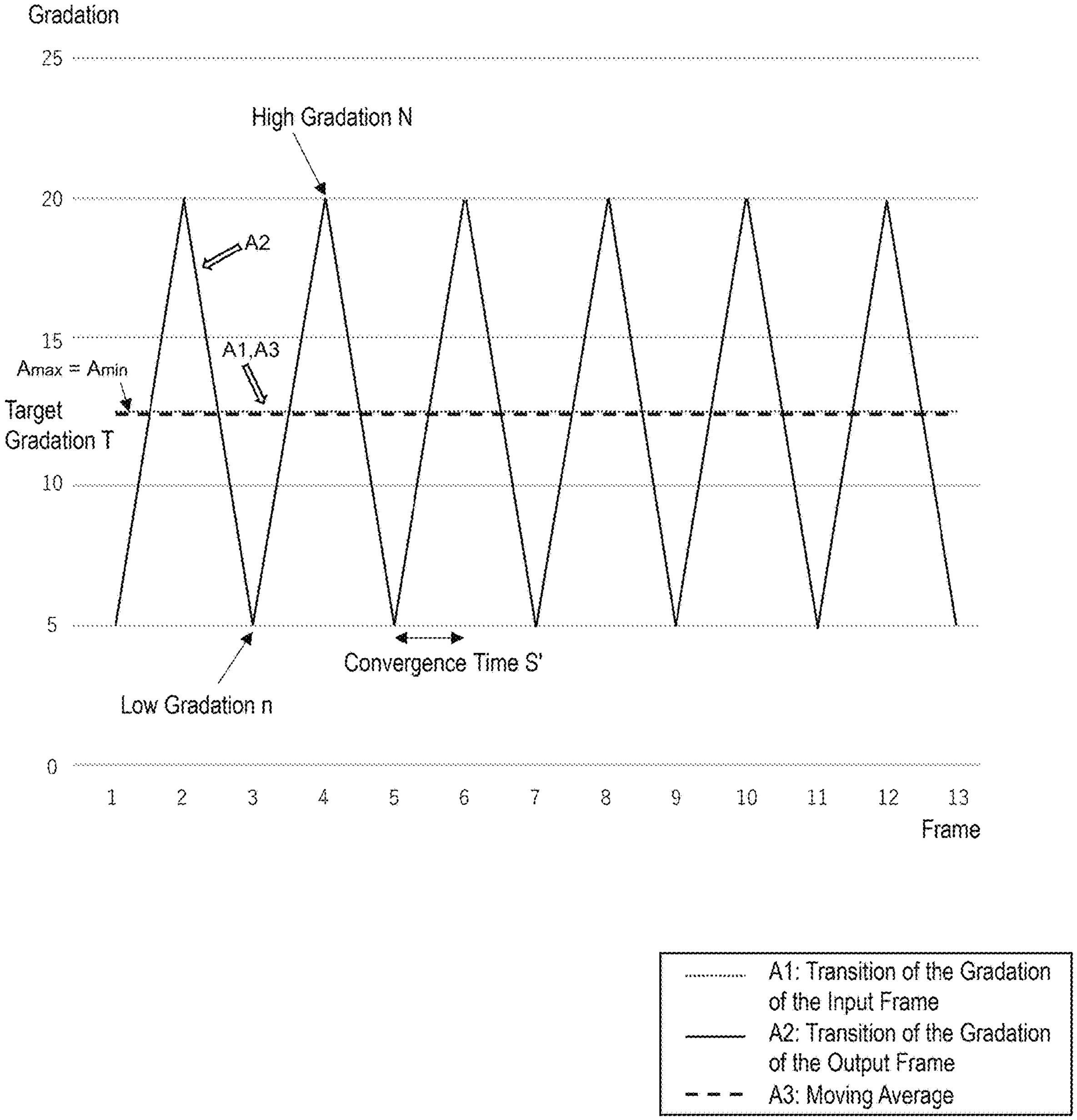
FIG. 6 shows an example of a gradation transition A2 of an output frame and a transition of a moving average A3 when the frame rate control processing according to the embodiment is executed for the same gradation transition A1 of the input frame as in FIG. 5.

The situation where flicker is suppressed will be described with reference to FIG. 6. FIG. 6 shows that an appropriate output frame was generated by the random number and the random number threshold used in the frame rate control processing according to the embodiment, and the moving average is constant. In the example of FIG. 6, although the difference between the low gradation n and the high gradation N is large, the time remaining at the low gradation n or the time remaining at the high gradation N is short. Therefore, it can be said that FIG. 6 shows a situation where the convergence time S' is short with respect to the integration time S. In other words, FIG. 6 shows an example of a situation where, due to the visual integration effect, $A_{min}$ and $A_{max}$ have become the value T of the target gradation, satisfying the above formula (4).

3-3. Gradation Transition when Flicker Occurs

Conversely, the situation when flicker occurs will be described with reference to FIG. 7.

Figure 7:
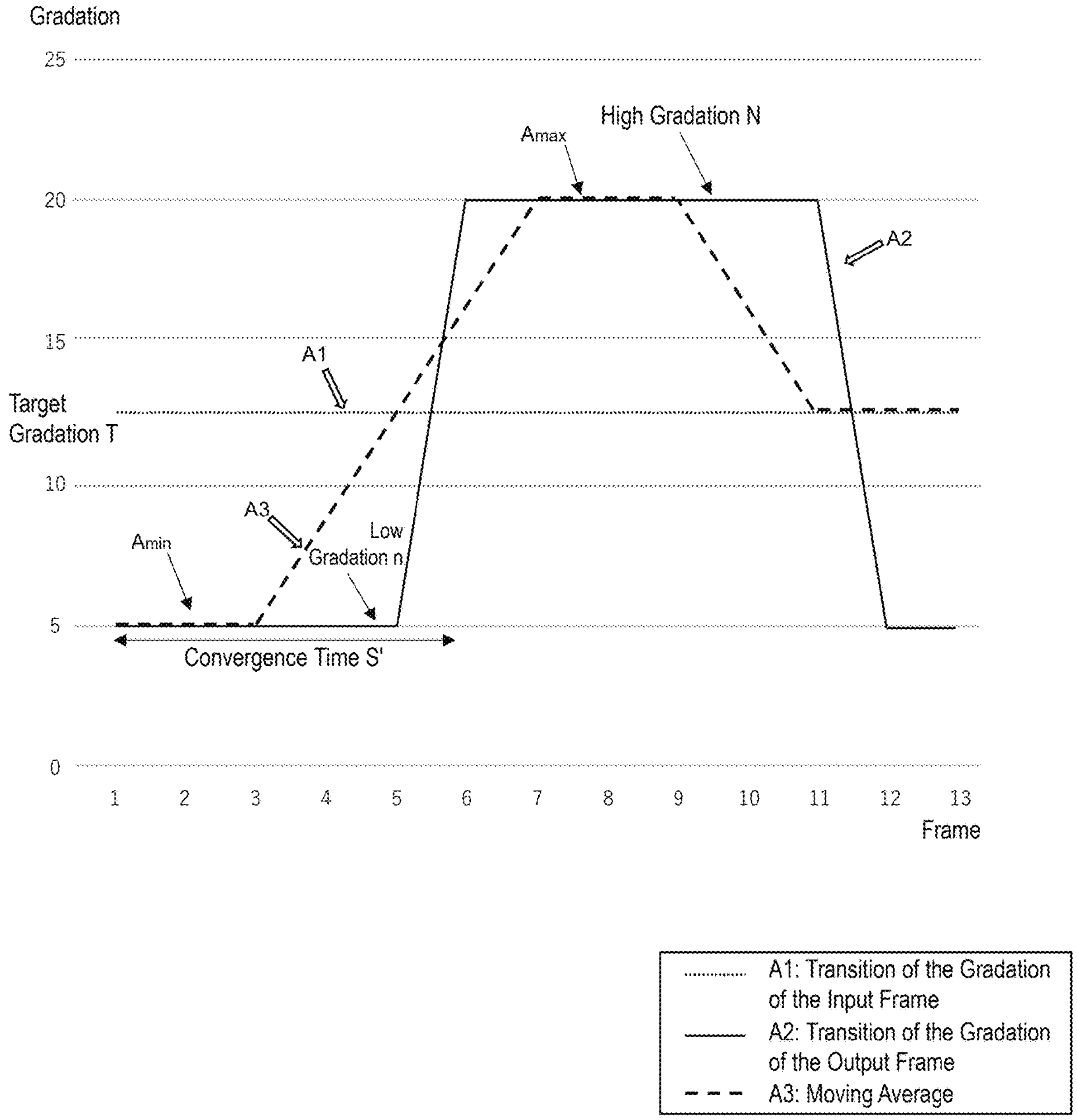
FIG. 7 shows an example of a situation in which the difference between the maximum value and the minimum value of the moving average exceeds the visual gradation discrimination threshold and is likely to be perceived as flicker.

FIG. 7 can be considered a situation where conventional frame rate control processing, different from the frame rate control processing according to the embodiment, is executed. In the output frame shown in FIG. 7, the difference between $A_{min}$ and $A_{max}$ in the moving average is considerably large. This is not only because the difference between the low gradation n and the high gradation N of the output frame is large, but also because the time the gradation of the output frame remains at the low gradation n or the time it remains at the high gradation N is long. When this duration becomes long, the convergence time S' tends to become long with respect to the integration time S. And if the difference between $A_{min}$ and $A_{max}$ (the moving average gradation difference) exceeds the visual gradation discrimination threshold, humans perceive the gradation transition, and flicker occurs.

3-4. Flicker Caused by Gradation Change in Spatial Direction

Figure 8:
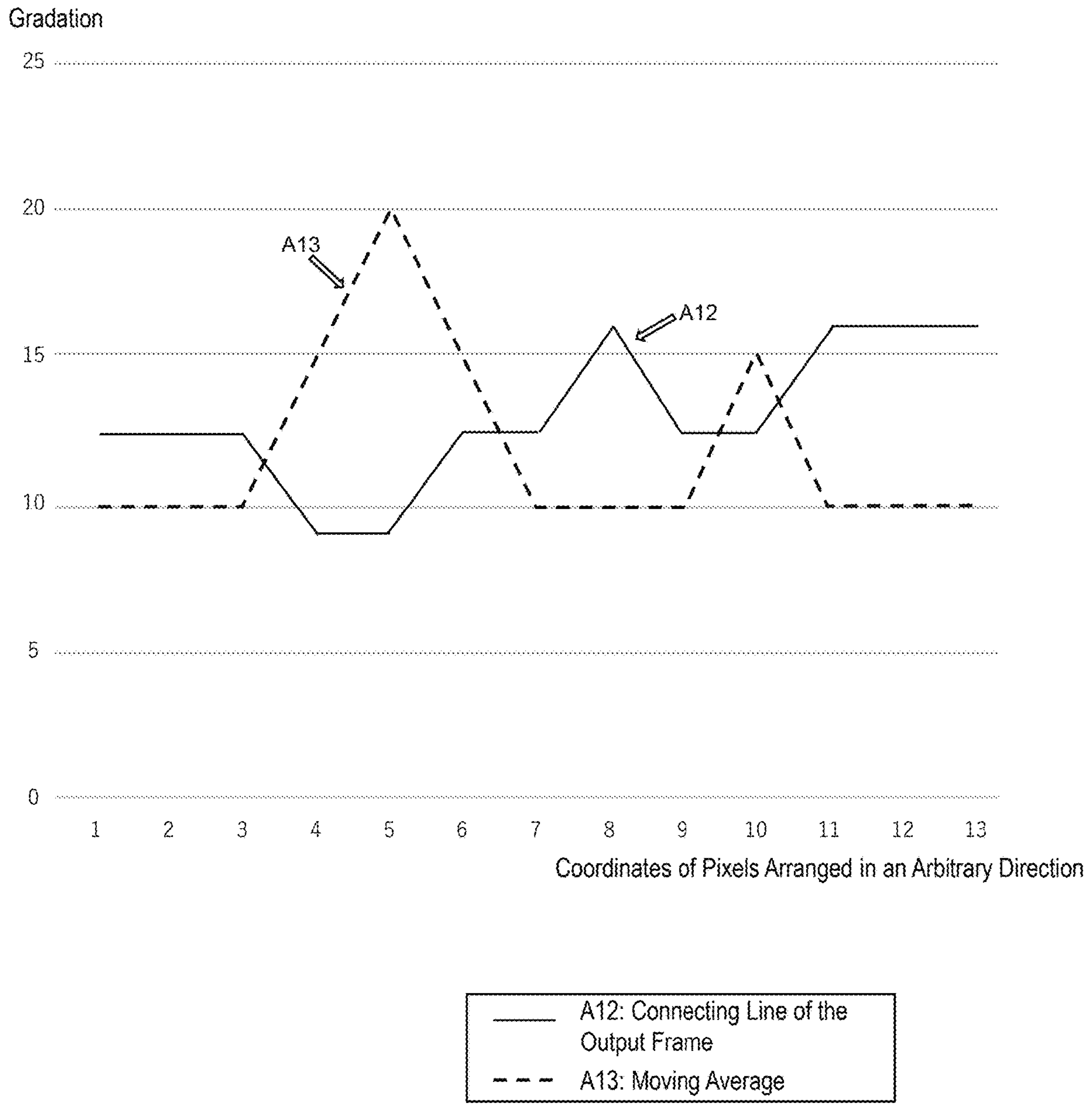
FIG. 8 is a graph for illustrating the occurrence of flicker due to a change in gradations in the spatial direction of a frame at an arbitrary timing.

FIGS. 5 to 7 have described the presence or absence of flicker based on the temporal change of the output frame, but flicker can also occur due to the change in gradation in the spatial direction, so this will be described with reference to FIG. 8.

If pixels of the same gradation are continuous in the spatial direction of the output frame, the value of the moving average also tends to fluctuate greatly. If the difference between the maximum value and the minimum value of the moving average exceeds the visual gradation discrimination threshold, image flicker occurs. Therefore, as described in the configuration of the random number generation unit 1, in the embodiment, in the spatial direction, the random numbers of the pixels of interest at each coordinate differ in aspect (corresponding to processing (a), processing (b), processing (c), or processing (d)). For this reason, when frame rate control processing is executed, the tendency for the gradations of adjacent pixels to be biased toward the same gradation is suppressed, and as a result, image flicker is suppressed.

4. Other Embodiments

In the embodiment, it was described that two gradations, a high gradation and a low gradation, are specified in the table as setting data, but it is not limited to this, and three or more gradations may be specified. That is, gradations other than the high gradation and the low gradation may be specified in the table.

In the embodiment, it was described that a predetermined upper limit value is provided for the target gradation of the setting processing unit 2, but it is not limited to this, and an upper limit value may not be provided. That is, the frame rate control processing described in the embodiment may be executed for all gradations.

In the embodiment, it is described that a predetermined upper limit value is provided for the target gradation in the setting data of the setting processing unit 2, but it is not limited to this. All pixels in the frame may be pixels of interest without providing an upper limit value.

The frequency of the input data output from the output device 200 may be lower than the frequency of the image display unit 30. In this case, in order to improve the quality of the displayed image, another frame can be added between each frame of the input data. At this time, this added frame may be generated by the frame rate control processing according to the embodiment.

In the embodiment, it was described that the random number generation unit 1 and the setting processing unit 2 are included in the image processing unit 20 of the image processing device 100, but it is not limited to this. For example, the random number generation unit 1 and the setting processing unit 2 may be provided in a separate device from the image processing device 100, and the image processing unit 20 may acquire random numbers and setting data from this separate device.

In the embodiment, it has been described that the output device 200 and the image processing device 100 are separate entities, but it is not limited to this, and these components may be integrated.

In the embodiment, it has been described that the image processing device 100 includes the image display unit 30, but it is not limited to this, and the image processing device 100 may not include the image display unit 30.

In the embodiment, one pixel was described as the minimum unit for executing frame rate control processing, but it is not limited to this. Since each pixel has an R (red) sub-pixel, a G (green) sub-pixel, and a B (blue) sub-pixel, these sub-pixels may be used as the minimum unit when executing frame rate control processing. In other words, when executing frame rate control processing, the pixel of interest may be processed for each pixel as described in the embodiment, or it may be processed for each sub-pixel. For example, in the case where frame rate control processing is performed for each pixel, suppose the RGB gradation values transition as, for example, (0, 0, 0), (0, 0, 0), (5, 5, 5), (0, 0, 0), (0, 0, 0). When frame rate control processing is performed for each sub-pixel, if they transition as (5, 0, 0), (0, 0, 0), (0, 5, 0), (0, 0, 0), (0, 0, 5), it is possible to obtain the same integration effect as the transition for each pixel described above.

The image processing unit 20 selects a gradation to be assigned to a pixel of interest in a plurality of input frames from a plurality of gradations based on the magnitude relationship between a random number and a random number threshold. Here, in the embodiment, as shown in FIG. 4, it was described that the random number threshold takes a larger value as the target gradation increases, and the low gradation is selected when the random number is greater than or equal to the random number threshold, but it is not limited to this. The random number threshold may take a smaller value as the target gradation increases, and in this case, the low gradation may be selected when the random number is less than the random number threshold (the high gradation is selected when the random number is greater than or equal to the random number threshold).

In the embodiment, it was described that the random number generation unit 1 generates (calculates) random numbers, but it is not limited to this, and for example, random numbers stored in the storage unit 40 may be used.

REFERENCE SIGNS LIST

1: Random Number Generation Unit
1A: First Random Number Generation Unit
1B: Second Random Number Generation Unit
2: Setting Processing Unit
3: Output Frame Generation Unit
3A: Determination Processing Unit
3B: Generation Processing Unit
10: Image Data Acquisition Unit
20: Image Processing Unit
30: Image Display Unit
40: Storage Unit
100: Image Processing Device
200: Output Device

The invention claimed is:

1. An image processing device configured to execute frame rate control processing for representing a target gradation based on a plurality of gradations, the image processing device comprising:

an image data acquisition unit; and an image processing unit that executes the frame rate control processing, wherein the plurality of gradations include at least an nth gradation (n≥0) and an Nth gradation (N≥n+2), wherein the target gradation is greater than the nth gradation and less than the Nth gradation, wherein the image data acquisition unit acquires a plurality of input frames, wherein the image processing unit selects a gradation to be assigned to a pixel of interest in the plurality of input frames from the plurality of gradations based on a magnitude relationship between a random number and a random number threshold, and generates a plurality of output frames for representing the target gradation based on the selected gradation, wherein the random number is provided for each pixel of interest, wherein the random number threshold is associated with the target gradation, the nth gradation, and the Nth gradation, and the random number threshold is set such that a rate at which the Nth gradation is selected becomes larger than a rate at which the nth gradation is selected, as the target gradation increases, and wherein the random numbers for adjacent pixels of interest are generated by processing (a), processing (b), processing (c), or processing (d), in the processing (a), the random numbers for the adjacent pixels of interest are sequentially generated in a temporal direction with a different algorithm for each adjacent pixel of interest, in the processing (b), the random numbers for the adjacent pixels of interest are sequentially generated in the temporal direction with the same algorithm for each adjacent pixel of interest, under a condition where at least one of an initial value of the random number and a period of the random number is different for each adjacent pixel of interest, in the processing (c), the random numbers for a plurality of the pixels of interest included in a plurality of adjacent regions are generated with a different algorithm for each adjacent region, and in the processing (d), the random numbers for the plurality of the pixels of interest in the plurality of adjacent regions are generated with the same algorithm for each adjacent region.

2. The image processing device of claim 1, wherein, when the gradation of the pixel of interest in consecutive output frames within a predetermined period is within a range from the nth gradation to the Nth gradation, n and N satisfy the following formula:

$$\frac{(N-n)(S'-S)}{S'} \leqq f(T)$$

where S is 0.008 seconds or more and 0.042 seconds or less, S' is 0.042 seconds or more and 1.000 second or less, function f is a function related to the target gradation and returns a range of a visual gradation discrimination threshold, and T is a value of the target gradation.

3. The image processing device of claim 1, wherein the nth gradation is a 0 gradation.

4. The image processing device of claim 1, wherein the image processing unit uses the random number threshold only when representing a target gradation that is equal to or less than a predetermined upper limit value.

5. The image processing device of claim 1, further comprising:

an image display unit configured to display the output frames generated by the image processing unit or frames processed based on the output frames.

6. An image processing method performed by a computer, for executing frame rate control processing for representing a target gradation based on a plurality of gradations, the method comprising:

an image data acquisition step; and an image processing step of executing the frame rate control processing, wherein the plurality of gradations include at least an nth gradation (n≥0) and an Nth gradation (N≥n+2), wherein the target gradation is greater than the nth gradation and less than the Nth gradation, wherein in the image data acquisition step, a plurality of input frames is acquired, wherein in the image processing step, a gradation to be assigned to a pixel of interest in the plurality of input frames is selected from the plurality of gradations based on a magnitude relationship between a random number and a random number threshold, and a plurality of output frames for representing the target gradation is generated based on the selected gradation, wherein the random number is provided for each pixel of interest, and wherein the random number threshold is associated with the target gradation, the nth gradation, and the Nth gradation, and the random number threshold is set such that a rate at which the Nth gradation is selected becomes larger than a rate at which the nth gradation is selected, as the target gradation increases, and wherein the random numbers for adjacent pixels of interest are generated by processing (a), processing (b), processing (c), or processing (d), in the processing (a), the random numbers for the adjacent pixels of interest are sequentially generated in a temporal direction with a different algorithm for each adjacent pixel of interest, in the processing (b), the random numbers for the adjacent pixels of interest are sequentially generated in the temporal direction with the same algorithm for each adjacent pixel of interest, under a condition where at least one of an initial value of the random number and a period of the random number is different for each adjacent pixel of interest, in the processing (c), the random numbers for a plurality of the pixels of interest included in a plurality of adjacent regions are generated with a different algorithm for each adjacent region, and in the processing (d), the random numbers for the plurality of the pixels of interest in the plurality of adjacent regions are generated with the same algorithm for each adjacent region.

7. A non-transitory computer-readable storage medium storing a program for causing a computer to execute the image processing method of claim 6.

* * * * *